Dec. 24, 1968   G. E. ZIEGLER   3,418,399
METHOD OF MAKING AN INSULATED PIPE STRUCTURE
Filed Sept. 13, 1965   2 Sheets-Sheet 1
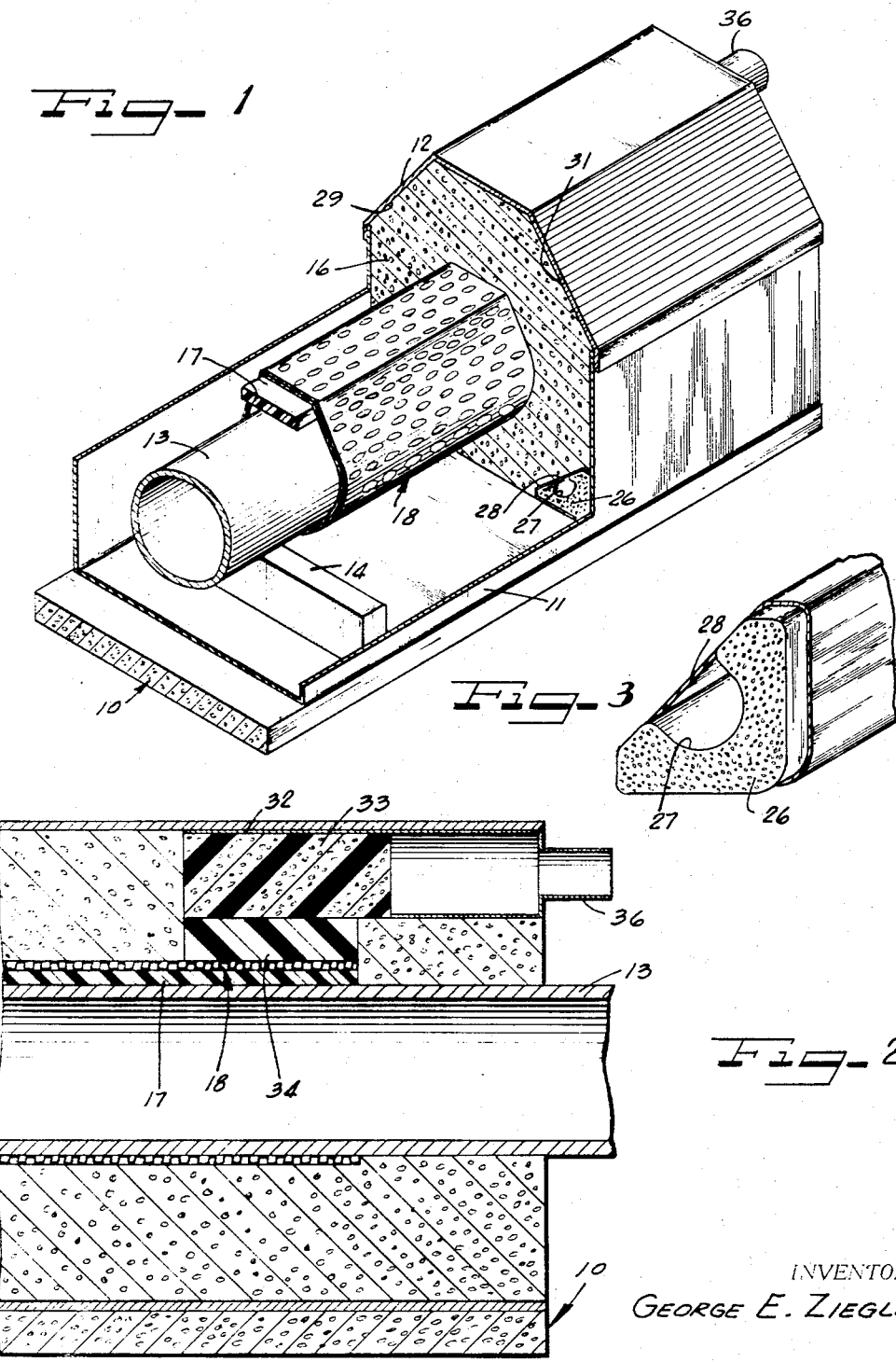
INVENTOR.
GEORGE E. ZIEGLER
ATTORNEYS

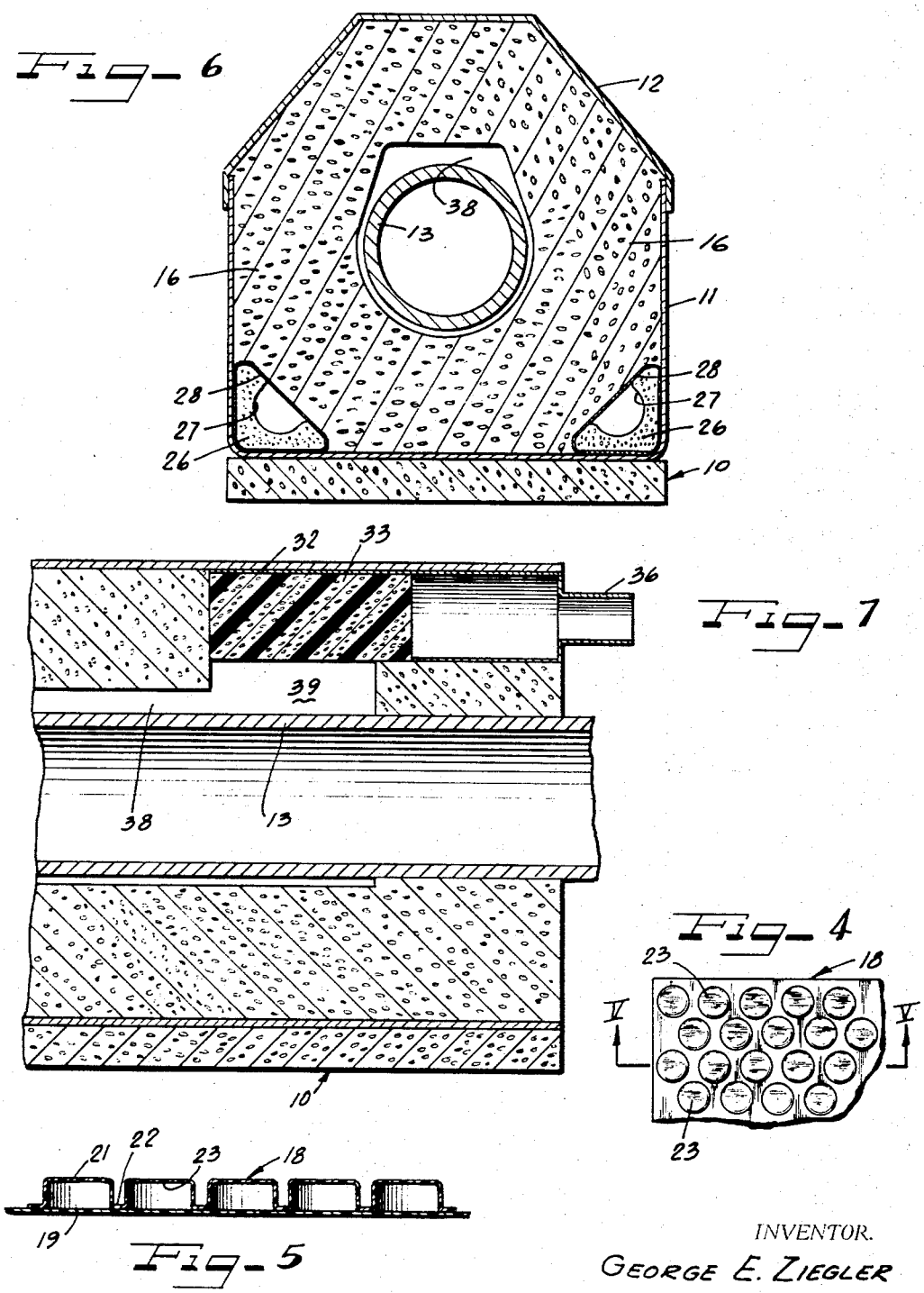

United States Patent Office 3,418,399
Patented Dec. 24, 1968

3,418,399
**METHOD OF MAKING AN INSULATED
PIPE STRUCTURE**
George E. Ziegler, Evanston, Ill., assignor to Concrete
Thermal Casings, Inc., Seattle, Wash., a corporation of
Washington
Continuation-in-part of application Ser. No. 205,023,
June 25, 1962. This application Sept. 13, 1965, Ser.
No. 487,004
5 Claims. (Cl. 264—35)

ABSTRACT OF THE DISCLOSURE

A method of making an insulated pipe structure, wherein thermoplastic structures are positioned around the pipe and melted out to form a plenum chamber about the pipe, preferably in combination with a preformed, rigid foam having a duct therealong for venting moisture vapor from said structure.

---

The present invention is a continuation-in-part of my copending application entitled "Method of Drying Pipe Embedded in Concrete," U.S. Ser. No. 205,023, filed June 25, 1962, and issued as U.S. Patent No. 3,206,867 on Sept. 21, 1965. The present invention represents an improvement over the method and apparatus described in the aforementioned copending application.

The method and apparatus of the present invention relate to insulated pipe installations, particularly pipe installations for carrying heated fluids, which pipe installations are embedded in a thermally insulating composition, and buried underground.

One particularly suitable type of installation for underground pipe systems involves the use of a relaitvely lightweight embedment of the type described in Goff United States Patent No. 2,355,966. While installations embodying the Goff type system have numerous advantages over other types of pipe embedment, such systems have the disadvantage of being rather permeable to moisture with the result that their insulating value decreases significantly whenever substantial amounts of moisture exists. Moisture vapor and liquid water may be present in insulation systems from various causes. Underground pipe installations may be damaged by improper backfill materials, or procedures, or by subsequent operations in the vicinity which cause a break in the waterproof casing materials which are commonly provided about the periphery of the pipe. In addition, if rupture of the pipe should occur due to improper welding or faulty pipe, the fluid from the pipe is likely to seep into the concrete casing.

Adidtionally, if the insulation is a hydraulically set concrete, a substantial excess of water is normally present in the concrete composition during its period of initial set. Unless the large excess of water is somehow removed, it remains to impair the insulation value of the concrete.

To overcome these difficulties, it has previously been suggested that the lightweight embedment be provided with vent passages within the body of the embedment extending in generally parallel relationship to the embedded pipe. The thermal gradient existing between the hot surface of the pipe and the cold surface of the embedment is sufficient to drive moisture vapor into the vent where it is carried off due to thermal siphoning, or by employing a positive displacement means such as a blower. Systems of this type are described in Lincoln L. Loper, Jr., U.S. Patent No. 3,045,707, and in my previous Patent No. 3,045,708.

The addition of the vent passages substantially overcomes the moisture penetration problem under normal operating circumstances. The vents alone, however, are incapable of restoring the system to operating condition within a short time when the insulation is completely flooded, as may occur from a break in the pipe or from the flooding of a manhole. Some contractors require that any underground pipe insulation system should be in normal thermal efficiency operation 48 hours after the water has been drained. They further specify that the system in its operating condition must have a moisture content less than 5%. The rapid removal of such large amounts of water from the insulation therefore poses a significant problem.

In accordance with the disclosure of my aforementioned copending application, there was provided an embedment of a relatively porous, insulating concrete having at least one vent passage extending in parallel spaced relation adjacent the pipe. Air under pressure was passed radially outwardly from the outer periphery of the pipe while a heated fluid was passed through the pipe. The thus heated air was passed through the insulation at a mass velocity sufficient to force the moisture contained in the embedment into the vent passage for elimination from the system. The system provided a plenum chamber about the periphery of the pipe into which air, at a controlled velocity, was introduced. The plenum chamber was formed by initially covering a substantial length of the pipe with a parting medium such as a corrugated paper treated with asphalt or the like. When steam was passed through the pipe, the asphalt was melted, and the paper charred, disintegrated, or at least was rendered porous to air flow.

The present invention provides an improved means for providing the plenum chamber about the periphery of the pipe by providing an installation in which the parting medium is cleanly removed by passage of a heated fluid through the pipe. The resulting plenum chamber provides an unimpeded path for the flow of air about the pipe in a much more efficient manner, with the result that I can reduce the number of vent passages in the embedment which might otherwise be required.

In addition to use with a thermally insulating concrete composition, the present invention is applicable to insulating compositions which are not hydraulically set. For example, in place of the concrete embedment, one may use a compacted mass of lightweight aggregate coated with a thermoplastic binder, as described in Goff U.S. Patent No. 2,901,775. Alternatively, the invention may also be employed with a high temperature foamed plastic material such as polyurethane.

One of the objects of the present invention is to provide an improved method for forming an air plenum chamber about an embedded pipe, utilizing the pipe wrapping which is completely and cleanly removed from about the periphery of the pipe by passage of a heated fluid through the pipe.

Another object of the present invention is to provide an improved underground pipe installation in which the air plenum chamber surrounding the pipe communicates with an improved outlet assembly.

Another object of the present invention is to provide an improved underground pipe installation which can utilize fewer vent passages than heretofore considered necessary.

Other objects and features of the present invention will be apparent to those skilled in the art from the following detailed description of the attached sheets of drawings which illustrate a preferred embodiment thereof.

In the drawings:

FIGURE 1 is a view in perspective, partially broken away to illustrate the manner in which the pipe insulation is built up;

FIGURE 2 is a fragmentary cross-sectional view of the pipe installation shown in FIGURE 1;

FIGURE 3 is a view in perspective of the duct forming means;

FIGURE 4 is a plan view of the improved parting medium which is used to form the plenum chamber about the pipe;

FIGURE 5 is an enlarged cross-sectional view of the medium shown in FIGURE 4;

FIGURE 6 is a cross-sectional view of the completed pipe installation; and

FIGURE 7 is a fragmentary cross-sectional view of the outlet end of the installation.

As shown in the drawings:

In FIGURE 1, reference numeral 10 indicates generally a poured structural concrete pad which rests upon the bottom of a trench dug for the purpose of accommodating a pipe-line. A water impervious membrane 11 composed of polyvinyl chloride or the like and having a generally U-shaped configuration is disposed over the pad 10, and a water impervious cover 12 overlaps the ends of the membrane 11 and is preferably heat sealed or adhesively secured to the membrane 11 at the areas of overlap. The impervious membranes 11 and 12 are not essential to the practice of the invention and may sometimes be eliminated.

In the embodiment shown in the drawings, there is provided a single fluid carrying pipe 13 although, obviously, any number of pipes can be included in the embedment. The pipe 13 is shown temporarily supported upon spaced support blocks 14 composed of a thermal insulating concrete mixture. In practice, the ends of the pipe will also be fixedly secured to suitable supports, but this structure has not been illustrated since it forms no part of the present invention.

The thermal insulation which provides the embedment for the pipe is generally indicated at reference numeral 16 in the drawings. This embedment may be composed of conventional insulating concrete, or preferably, consists of a mixture of an expanded aggregate such as expanded vermiculite or perlite coated with a thin film of a bituminous material and combined with a water insoluble stearate waterproofing agent, an air entraining agent, and a metal passivator, the foregoing ingredients being combined with Portland cement and water in making up the concrete. The coated aggregate is preferably of the type described in Sucetti U.S. Patent No. 2,824,022, issued on Feb. 18, 1958. The aggregate particles, as described in that patent, are coated with a continuous, uniformly thin film of water resistant material of a thickness less than about 10 microns, the particles being noncoalescing and having a substantially reduced capillary uptake capacity.

The water insoluble stearate is preferably calcium stearate but may consist of aluminum stearate or zinc stearate. Generally, at least 0.1 pound of the stearate should be added for every cubic foot of the aggregate. At quantities greater than about 0.5 pound of stearate, there is little additional benefit to be derived and the cost may become excessive.

The air entraining agent can be any surface active material which is normally used to entrain air in aqueous systems, and I prefer to use a material such as "Hercules NVX" because this material provides a particularly strong and permanent bubble structure when present in the wet, insulating concrete mass and also provides some waterproofing effect of its own. "Hercules NVX" is a neutralized "Vinsol" resin, the latter being a mixture of resinous materials recovered as a black residue after the extraction of rosin with petroleum solvents. The preferred range for the air entraining agent is from 0.01 to 0.2 pound of the agent per cubic foot of micaceous aggregate.

A passivator is added to lower the electromotive force which is inherently present between the metal pipe and its environment, which electromotive force could cause electrolytic corrosion. Sodium nitrite is particularly preferred for this use, but potassium or sodium dichromate can also be substituted but with less effective results. Sodium nitrite should be added in quantities of at least 0.04 pound per cubic foot of the aggregate. Quantities in excess of about 0.3 pound per cubic foot are not necessary and become expensive.

The waterproofing premix, containing the stearate, air entraining agent, and passivating agent is added to the coated aggregate particles (usually having a density of 6 to 8 pounds per cubic foot) in a ratio of about 2 pounds of the dry powder to 3 cubic feet of the coated vermiculite aggregate. The resulting mixture is then combined with Portland cement and water in the normal ratios for making lightweight concrete, that is, one bag of Portland cement (94 pounds) to 4 to 10 cubic feet of the premix.

Before the insulating concrete is poured about the periphery of the pipe 13, the parting medium for the formation of the air plenum chamber is first positioned about the periphery of the pipe 113. Specifically, a pad 17 composed of a meltable thermoplastic material, preferably in foam form such as foamed polystyrene, or the like, is positioned above the pipe 13, and wrapped with a meltable thermoplastic film material generally indicated at reference numeral 18 in the drawings. As best seen in FIGURES 4 and 5, this material consists of a laminate of two thermoplastic sheets consisting of a base sheet 19 and an outer sheet 21 heat sealed together at spaced areas generally indicated at 22 thereby providing bubbles or pockets 23 in which air is trapped. This material is available commercially in various forms, under the trade name "Air-cap."

Another improvement of the present invention resides in the manner in which one or more air vents are provided in the embedment. Instead of forming the vents after pouring of the concrete I may use preformed vents disposed, for example, in the corners of the embedment, and consisting of the type of structure shown in FIGURE 3 of the drawings. Specifically, the vent forming means may take the form of a generally triangular rigid foam block 26 having an arcuate duct 27 running longitudinally thereof. The block of foam material is wrapped with a vapor permeable, filter media such as a coated paper 28 which prevents the concrete from seeping through into the duct. The blocks of foam material are positioned at opposite sides of the trench in spaced relation to the pipe 13, and then the slurry of thermal insulating concrete is poured about the pipe and over the duct formers.

Because of the efficiency of the plenum chamber produced according to the present invention, I can reduce a number of air vent ducts which have heretofore been used. Consequently, the concrete embedment 16 may be formed with chamfered sides 29 and 31 at the upper portions thereof since it is normally not necessary to include vent passages in this area. This results in a saving of concrete without a loss in efficiency.

At the discharge end of the conduit system, as illustrated in FIGURE 2 of the drawings, there is provided a sheet metal housing 32 in which there is disposed a nonmeltable barrier material 33, and a block of meltable thermoplastic material 34. The function of the non-meltable material 33 which may consist of reticulated polyurethane, matted glass fibers, or other material offering a significant resistance to air flow is to avoid a chimney effect by means of which air from the plenum chamber surrounding the pipe would be drawn with substantial mass velocity longitudinally through the installation, and discharged through the outlet conduit 36. Alternatively, the control of air flow through the plenum chamber can be controlled mechanically by providing suitable baffle means within the sheet metal housing 32, or by providing a damper valve in the discharge outlet 36.

After the thermal insulating concrete has been poured and taken an initial set, steam or other high temperature fluid is passed through the pipe 13, whereupon the pad 17, the wrapper 18, and the block 34 all composed of meltable thermoplastic material are melted out cleanly and are absorbed in the surrounding monolithic concrete embedment because of the permeable nature of the concrete. The resulting configuration is shown in FIGURES 6 and 7 of the drawings. The pipe 13 is provided with a spaced plenum chamber 38 which has been formed by the melting of the pad 17 and the wrapper 18. During operation, air at a controlled velocity can be introduced into the plenum chamber 38 by suitable means (not shown) whereupon it is warmed by contact with the hot surface of the pipe 13 since the fluid in the pipe is normally at a temperature above the ambient temperature of the surroundings, and is usually above the boiling point of water. This air, under a slight positive pressure then diffuses radially through the insulation and into the vent passages 27 from which the moisture laden air is removed. The removal of air and water vapor from the vent passages can be increased by thermal siphon effects or by providing a positive displacement means such as a blower in communication with the vent passages.

The pressure differential between the plenum chamber 38 provided about the periphery of the pipe and the vent passages 27 need not be very high, as I have found that a pressure difference as low as one-half inch of water gauge can be employed for practical drying rates. The maximum pressure differential is determined by the fluid flow characteristics of the vent passages. Applied pressures in excess of about 125 pounds per square inch are not practical nor are they necessary to secure the improved results of the invention.

The air flow rate is the most important single factor in securing proper diffusion drying. Actually, with more porous concrete mixes, the air flow rate will be higher. Generally speaking, therefore, an air flow rate of 2 to 25 cubic feet per inch of insulation thickness per minute per inch of water pressure difference per square foot of insulation cross-section perpendicular to the direction of air flow will be appropriate.

At the discharge end, the plenum chamber 38 communicates with an annular air space 39 formed by the melting of the thermoplastic material 34. Some air passes through the constriction provided by the barrier material 33 confined in the sheet metal housing 32, and finally passes out of the pipe assembly by means of discharge conduit 36.

From the foregoing, it will be understood that the method and apparatus of the present invention provides a convenient and rapid technique for providing a clearly defined plenum chamber about the periphery of an embedded pipe. The efficiency of the new system makes it possible to effect further economies in the installation by eliminating the need of numerous vent passages, and reducing the amount of insulating concrete required.

It will be evident that various modifications can be made to the described embodiments without departing from the scope of the present invention.

I claim as my invention:

1. The method of providing an air plenum chamber about an embedded pipe which comprises wrapping a laminated thermoplastic film structure consisting of a base thermoplastic sheet and an outer sheet bonded thereto, said outer sheet including pockets in which air is trapped, pouring a thermal insulating composition about the wrapped pipe to embed the same, and passing a heated fluid through said pipe to thereby melt said film structure and leave a void space between the periphery of said pipe and the surrounding embedment.

2. The method of providing an air plenum chamber about an embedded pipe which comprises wrapping a meltable thermoplastic film material about said pipe, supporting said pipe in a trench, positioning at least one rigid duct containing element in said trench in spaced parallel relation to said pipe, pouring a thermal insulating concrete about said pipe and over said duct forming element, and passing a heated fluid through said pipe to thereby melt said film material and leave a void space between the periphery of said pipe and the surrounding concrete embedment.

3. The method of providing an air plenum chamber about an embedded pipe which comprises positioning a pad of meltable thermoplastic foam material on the periphery thereof along the length of said pipe, wrapping a meltable thermoplasttic film material about said pad and said pipe, pouring a thermal insulating concrete about the wrapped pipe to embed the same, and passing a heated fluid through said pipe to thereby melt said film material and said foam material to leave a void space between the periphery of said pipe and the surrounding concrete embedment.

4. The method of providing an air plenum chamber about an embedded pipe which comprises positioning a pad of meltable thermoplastic foam material on the periphery thereof along the length of said pipe, wrapping a laminated thermoplastic film structure consisting of a base thermoplastic sheet and an outer sheet bonded thereto about said pipe and said pad, said outer sheet including pockets in which air is trapped, pouring a thermal insulating concrete about the wrapped pipe to embed the same, and passing a heated fluid through said pipe to thereby melt said film material and said foam material to leave a void space between the periphery of said pipe and the surrounding concrete embedment.

5. The method of providing an air plenum chamber about an embedded pipe which comprises positioning a pad of meltable thermoplastic foam material on said pipe, wrapping a meltable thermoplastic film material about said foam material and said pipe, said film material comprising a laminate of a base ply and an outer ply laminated to said base ply and including air pockets therebetween, positioning the wrapped pipe in a trench, positioning at least one rigid duct containing element in said trench in spaced relation to said pipe, pouring a thermally insulating concrete about said pipe and over said duct containing element, and passing a heated fluid through said pipe to thereby melt said foam material and said film material to leave a void space between the periphery of said pipe and the surrounding concrete embedment.

References Cited

UNITED STATES PATENTS

| | | | |
|---|---|---|---|
| 429,041 | 5/1890 | Lynch | 138—106 |
| 2,179,057 | 11/1939 | Schuetz | 138—11 |
| 2,355,966 | 8/1944 | Goff | 138—106 |
| 2,360,067 | 10/1944 | McLeish | 138—149 |
| 2,663,323 | 12/1953 | Thomas | 138—105 |
| 2,707,984 | 5/1953 | Goff | 138—106 |
| 2,773,512 | 12/1956 | Burk | 138—145 |
| 2,824,022 | 2/1958 | Sucetti | 117—54 |
| 2,901,775 | 9/1959 | Goff | 138—11 |
| 2,903,018 | 9/1959 | Goff | 138—145 |
| 2,972,968 | 2/1961 | Stafford | 138—105 |
| 2,978,840 | 4/1961 | Tatsch | 138—106 |
| 3,007,203 | 11/1961 | Ammons | 138—146 |
| 3,045,707 | 7/1962 | Loper | 138—106 |
| 3,045,708 | 7/1962 | Ziegler | 138—106 |
| 3,206,867 | 9/1965 | Ziegler | 138—106 |

ROBERT F. WHITE, *Primary Examiner.*

K. J. HOVET, *Assistant Examiner.*

U.S. Cl. X.R.

156—86, 196; 264—317; 25—128; 138—105